US012393830B2

(12) United States Patent
Jones

(10) Patent No.: US 12,393,830 B2
(45) Date of Patent: Aug. 19, 2025

(54) DEEP LEARNING COMPUTATIONAL STORAGE DRIVE

(71) Applicant: Seagate Technology LLC, Fremont, CA (US)

(72) Inventor: Marc Tim Jones, Longmont, CO (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 1030 days.

(21) Appl. No.: 17/348,569

(22) Filed: Jun. 15, 2021

(65) Prior Publication Data

US 2022/0398442 A1 Dec. 15, 2022

(51) Int. Cl.
*G06N 3/08* (2023.01)
*G06N 3/063* (2023.01)

(52) U.S. Cl.
CPC .............. *G06N 3/063* (2013.01); *G06N 3/08* (2013.01)

(58) Field of Classification Search
CPC ......... G06N 3/063; G06N 3/08; G06N 3/0464
See application file for complete search history.

(56) References Cited

U.S. PATENT DOCUMENTS

| | | | |
|---|---|---|---|
| 10,402,091 B1* | 9/2019 | Vankamamidi | ....... G06F 3/0604 |
| 10,452,444 B1 | 10/2019 | Jibaja et al. | |
| 10,725,825 B2 | 7/2020 | Sindhu et al. | |
| 10,776,322 B2* | 9/2020 | Danilov | .............. G06F 16/1794 |
| 10,915,381 B2 | 2/2021 | Costa et al. | |
| 11,604,794 B1* | 3/2023 | Nallapati | .......... G06F 16/24522 |
| 11,748,418 B2* | 9/2023 | Varnica | ............... H04L 67/1097 |
| | | | 709/217 |
| 2017/0131912 A1* | 5/2017 | Sinha | ...................... G06F 3/065 |
| 2018/0113769 A1* | 4/2018 | Ahn | .................... G06F 11/1469 |
| 2019/0004737 A1* | 1/2019 | Khan | .................... G06F 3/0679 |
| 2019/0034976 A1* | 1/2019 | Hamedi | ............. G06Q 30/0243 |

(Continued)

OTHER PUBLICATIONS

Gu, Boncheol, "Biscuit: A Framework for Near-Data Processing of Big Data Workloads," 2016 ACM/IEEE 43rd Annual International Symposium on Computer Architecture, pp. 153-165.

(Continued)

*Primary Examiner* — Phenuel S Salomon
(74) *Attorney, Agent, or Firm* — HOLZER PATEL DRENNAN

(57) ABSTRACT

Use of computational storage drives (CSDs) in a machine learning pipeline. The CSD may include a machine learning coprocessor capable of natively executing a machine learning model on raw data stored locally at the CSD. In turn, one or more lower order machine learning operations may be executed at a CSD in response to a read/transform command issued by a host. In turn, the CSD may return transformed data comprising data or metadata that is an output of the lower order machine learning operations. This approach may allow for application of a machine learning model locally to input data stored on the CSD having the machine learning coprocessor. This may avoid network bandwidth associated with traditional read and write operations for input and output data from a machine learning pipeline. Moreover, use of CSDs may provide highly parallelized processing using CSDs for application of machine learning operations at the edge of a network.

14 Claims, 10 Drawing Sheets

(56) References Cited

U.S. PATENT DOCUMENTS

| | | | |
|---|---|---|---|
| 2019/0147125 A1* | 5/2019 | Yu | G06N 3/047 |
| | | | 703/10 |
| 2019/0236051 A1* | 8/2019 | Datta | G06F 16/172 |
| 2020/0004685 A1 | 1/2020 | Guim Bernat et al. | |
| 2020/0159445 A1* | 5/2020 | Kachare | G06F 3/0604 |
| 2020/0201692 A1 | 6/2020 | Kachare et al. | |
| 2020/0293378 A1* | 9/2020 | Gold | G06F 3/0649 |
| 2020/0301898 A1 | 9/2020 | Samynathan et al. | |
| 2020/0310694 A1 | 10/2020 | Gao et al. | |
| 2021/0035556 A1* | 2/2021 | Shen | G06F 18/24765 |
| 2022/0036214 A1* | 2/2022 | Venugopal | G06N 20/00 |
| 2022/0398442 A1* | 12/2022 | Jones | G06N 3/08 |
| 2024/0020113 A1* | 1/2024 | Pappu | G06F 8/38 |

OTHER PUBLICATIONS

Feng, Ziqiang et al., "The Role of Active Disks in Edge Computing," Open Edge Computing Workshop, Dec. 2019.

Feng, Ziqiang et al., "Edge-Based Discovery of Training Data for Machine Learning," 2018 Third ACM/IEEE Symposium on Edge Computing, pp. 145-158.

\* cited by examiner

DEEP LEARNING COMPUTATIONAL STORAGE DRIVE

BACKGROUND

With the introduction of deep learning as a key model for machine learning, algorithms have been developed that significantly grow the complexity and system requirements for execution of such algorithms. For example, current systems for executing machine learning algorithms, particularly those using deep learning, rely on the use of high-end servers, graphics processing units (GPUs), and large quantities of memory. As such the cost of systems capable of executing such deep learning approaches may be prohibitive for many machine learning applications.

Moreover, such deep learning may be applied to a vast corpus of data to which a machine learning model is applied to extract relevant data. In turn, the systems must be equipped with massive amounts of persistent storage. Even so, given the vast quantity of data to which a machine learning process is applied, often data must transit networks, which occupies large amounts of network bandwidth and may cause bottlenecks or other inefficiencies in the machine learning process.

SUMMARY

Accordingly, the present disclosure generally relates to use of a computational storage drive in a machine learning pipeline. As described herein, use of one or more computational storage drives may facilitate execution of at least one machine learning operation locally at a storage device having persistent storage in which raw data is stored. Specifically, the computational storage drive may comprise a machine learning coprocessor that is provided in the drive (e.g., within the enclosure providing the persistent storage). The drive may also include a computational program memory in which raw data from the persistent storage media of the drive may be provided for application of a machine learning model to the raw data using the machine learning coprocessor. The computational storage drive may include one or more high speed data busses including a host interface bus and/or a non-volatile memory bus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
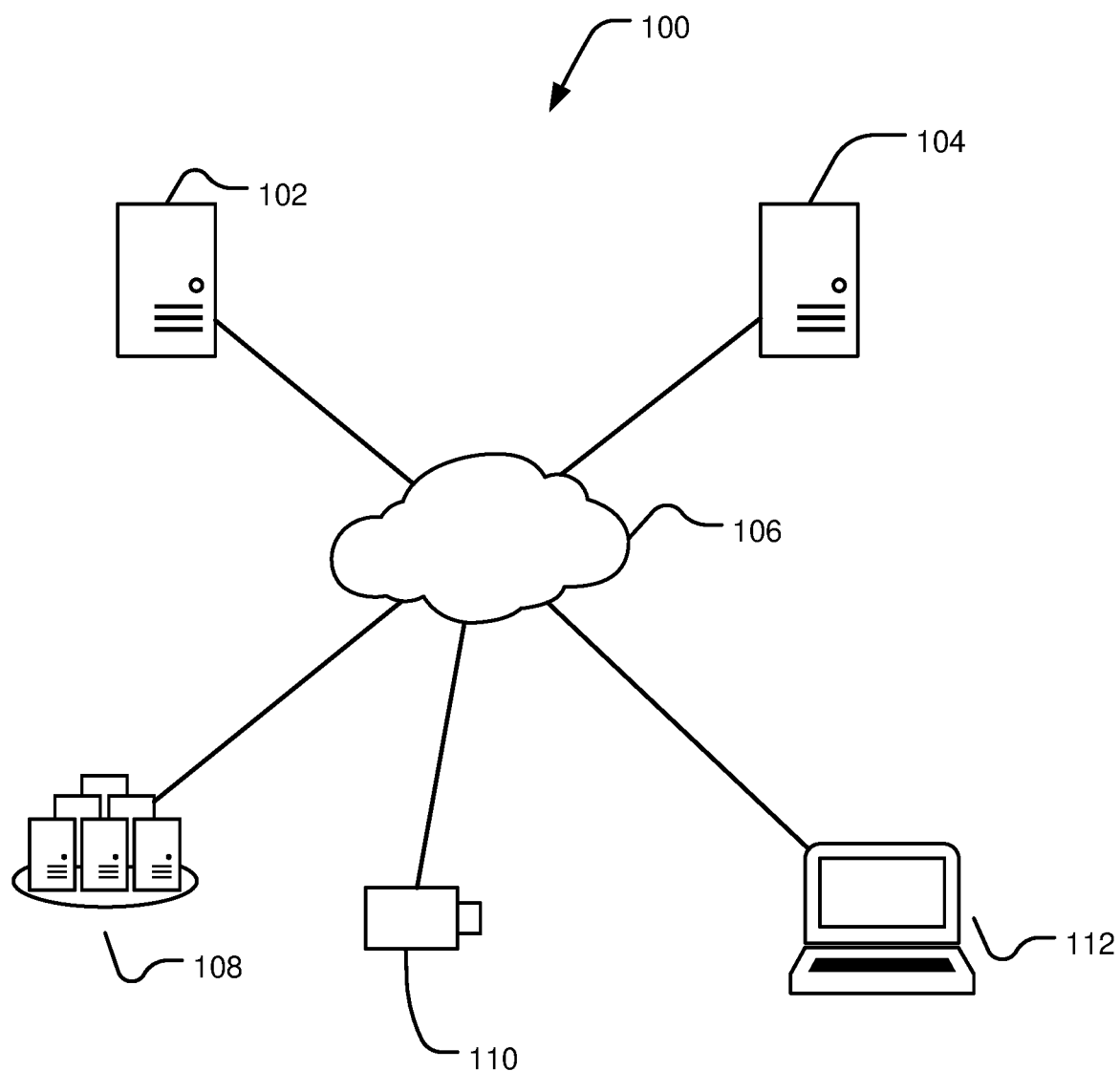
FIG. 1 depicts an example of a network according to the present disclosure.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

With the growing complexity of machine learning algorithms, particularly deep learning algorithms, system requirements necessary to successfully execute the machine learning models may make such machine learning approaches prohibitive or, at a minimum, exceedingly costly and complex. Moreover, the size of data to which machine learning algorithms are applied is growing ever larger. Use of machine learning to analyze "big data" may require vast persistent storage requirements to store source data on which machine learning is to be applied. In a more likely scenario, data on which machine learning is executed may reside at distributed storage nodes such that vast amounts of data may transit networks for processing of the data using machine learning algorithms.

In turn, the present disclosure presents computational storage drives or devices (CSDs) that may be used in a machine learning pipeline. As will be discussed in greater detail herein, use of CSDs in a machine learning pipeline may present a number of advantages that may allow more robust or efficient machine learning algorithms to be applied to data. For example, the use of CSDs may provide highly parallel processing of data, which may distribute the computational capacity of a machine learning system to a plurality of CSDs provided in the system. Further still, the use of CSDs may facilitate processing of data at or near edge devices at or from which data is generated. In turn, data may be processed much more locally to the data source or storage location to reduce the requirement that large amount of data be provided over network connections (e.g., to a central processor or host device).

Such CSDs may leverage technological advances in artificial intelligence (AI) approaches that may allow for migration of machine learning to low-power edge workloads outside of traditional data center processing. Examples of this trend toward AI approaches with low-power requirements include microprocessors that performs deep learning neural compute workloads with very little power consumption (e.g., around 2.5 W). Another example is the integration of deep learning capabilities into smartphones. In short, recent advances in microprocessor, memory, and related systems may facilitate computational hardware capable of advance machine learning processing capability at relatively low power. Specifically, the present disclosure contemplates incorporation of such computational hardware locally within a drive enclosure such that the local computational hardware provided at the drive may work to execute machine learning on raw data stored locally at the drive. In turn, the raw data may be transformed at the CSD to transformed data (e.g., including machine learning supplemented metadata) that can be returned to a host for inclusion in higher order machine learning operations.

As such, the present disclosure recognizes that computational resources for applying one or more machine learning processes at a storage drive comprising persistent storage may be realized. The present disclosure contemplates incorporation of such CSDs in a machine learning pipeline. In turn, the CSDs may merge the concept of low-power deep learning with a storage drive to enable deep learning computational storage workloads at the drive level to offload servers of this task.

With reference to FIG. 1, an example environment 100 is illustrated in which one or more computational storage drives (CSDs) may be deployed. The environment 100 may include a first host 102, a second host 104, a data center 108, and one or more edge devices such as edge device 110 and edge device 112. Each of the foregoing devices may be in operative communication via a network 106. The network 106 may be any appropriate network including a wide area network such as the Internet, intranets, or the like. Moreover, any of the devices may include one or more CSDs as will be described in greater detail below. A data center 108 may provide mass storage and/or processing capabilities in the form of distributed memory and/or computational resources. Further still, the edge devices 110 and 112 (e.g., corresponding to an IP enabled camera and a personal computing device in the depicted example) may capture or generate data that may be stored locally at the edge devices 110 and 112 at CSDs located at the respective edge devices 110 and 112. As will be described in greater detail below, use of CSDs in a machine learning pipeline may allow more efficient utilization of the computational resources at the various devices depicted and/or more efficient use of the resources of the network 106.

CSDs described herein may include feature sets in the drive to support the downloading of programs that are interpreted or natively executed through translation. For instance, such feature sets may include extended Berkley Packet Filter (eBPF). The eBPF instruction set lacks floating point instructions, which makes it incompatible with traditional neural network architectures. However, by adding a coprocessor that accelerates convolutional neural networks on a microprocessor with low power, computational capability can be added to a drive to provide GPU-like functionality for machine learning workloads at the drive itself. Thus, a machine learning coprocessor comprising computational capability may be provided to natively execute a machine learning model or a customizable machine learning algorithm that may be stored at the CSD. That is, the CSD may, within a given enclosure, include persistent storage for storage of raw data and include a machine learning coprocessor capable of applying a machine learning model to the locally stored raw data to generate transformed data. Computational storage may include or apply feature sets such as eBPF as a platform for embedding computation in a drive. Use of such feature sets has advantages (such as the capability for universally executable function). However, these feature sets may also have limitations such as the lack of floating point. Thus, to enable true deep learning workloads, CSDs may include deep learning capabilities built within (e.g., provided locally at a CSD via a machine learning coprocessor). Given the trend of tiny AI (for edge workloads), it's now possible to embed such deep learning capabilities (such as convolutional neural networks) into a drive with the low power constraints. It is possible to combine architectures to support both traditional computational storage (e.g., using eBPF) with a machine learning coprocessor to provide native execution of a machine learning model (e.g., in a native programming language applied in other machine learning operations in a machine learning pipeline that may be executed remotely from the CSD). In this way, the eBPF could coexist with deep learning offloads to the machine learning coprocessor for support of a broad set of use-models. This could also represent a mixed-use case where data is first processed by the deep learning coprocessor and then by an eBPF computational model provided on the drive.

Figure 2:
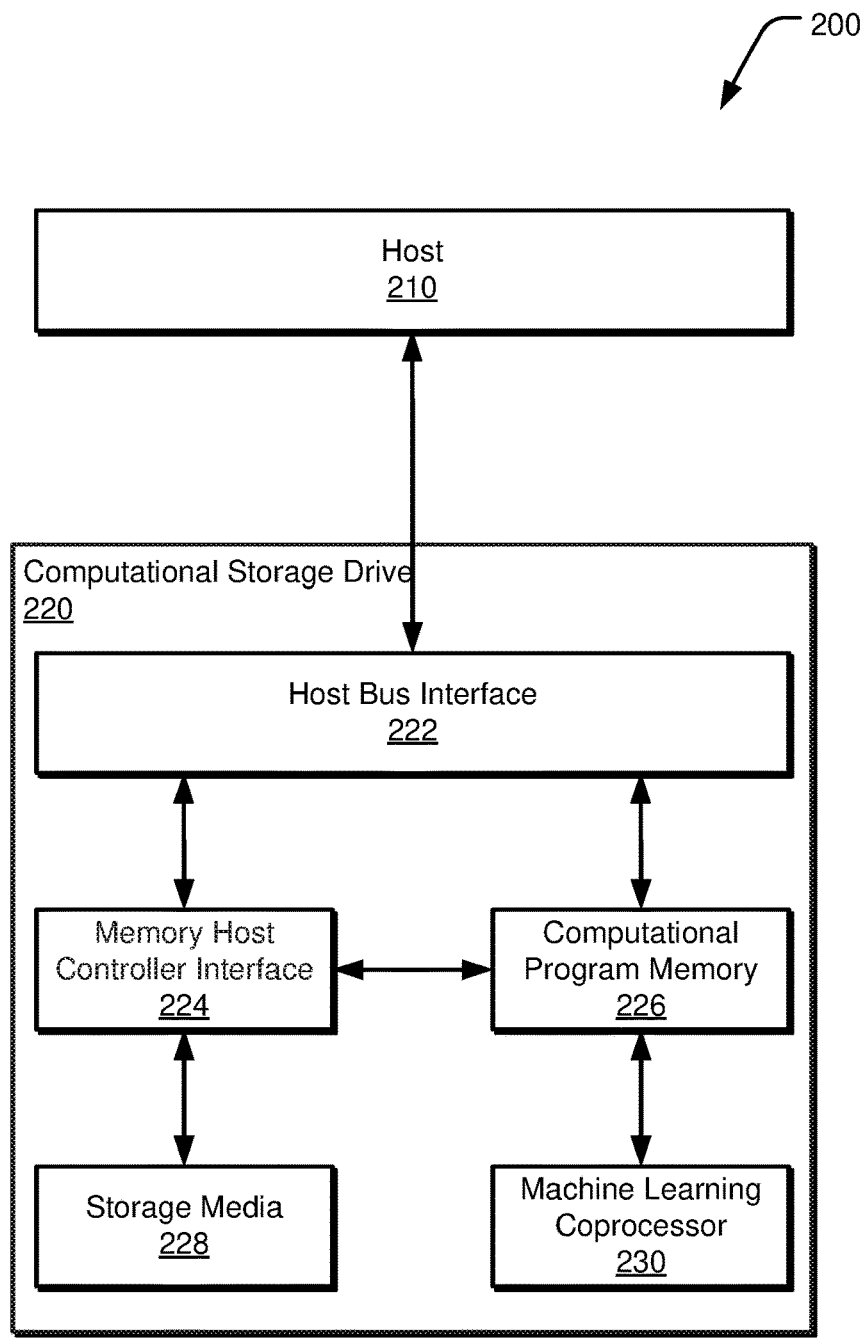
FIG. 2 depicts a schematic view of an example computational storage drive according to the present disclosure.

One possible embodiment of an approach for CSDs according to the present disclosure is to integrate a PCI-based machine learning coprocessor (e.g., including deep learning capability) into a CSD which is accessible via PCI from the drive controller processor. Sharing memory (such as a computational program memory buffer) allows the drive to populate the computational program memory with input data from local storage media to allow processing by the machine learning coprocessor. In turn, the machine learning coprocessor may provide results back to the shared computational storage memory. In addition, the result can be applied back to media or accessed by the host directly through the PCI interface. FIG. 2 illustrates a canonical architecture that embeds deep learning into a drive through a shared computational program memory).

In FIG. 2, a CSD 220 may be in operative communication with a host 210. While not shown in FIG. 2, the CSD 220 may be in networked communication with the host 210 rather than the depicted direct communication. For instance, the host 210 may correspond to a host 102 and/or host 104 in FIG. 1, and the CSD 220 may be a locally provided CSD 220 at any of the network devices shown in FIG. 1.

In any regard, the CSD 220 may include a host bus interface 222. The host bus interface 222 may be a high-speed serial computer expansion bus such as a PCIe interface or the like. The host bus interface 222 may be in further communication with a memory host controller interface 224. In an example, the memory host controller interface 224 may provide a local non-volatile memory bus for access to storage media 228 provided locally to the CSD 220. In one example, the memory host controller interface 224 may be provided according to the Non-Volatile Memory Host Controller Interface Specification (NVMHCIS) in the form of an NVM Express (NVMe) interface. The host bus interface 222 may also be in operative communication with shared computational program memory 226. A machine learning coprocessor 230 is provided in operative communication with the computational program memory 226.

The storage media 228 of the CSD 220 may provide for persistent, non-volatile storage of a relatively large amount of data. In turn, the storage media 228 may comprise one or more hard disk drives (HDD), solid state drives (SSDs), and/or combinations thereof to enable persistent storage of relatively large amounts of data (e.g., measured in gigabytes, terabytes, or larger quantities). In turn, the memory host controller interface 224 may be operative to retrieve raw data from the storage media 228 to populate the computation program memory 226 such that the machine learning coprocessor 230 may execute a machine learning model on the raw data in the computational program memory 226. By raw data, it is intended to indicate that the data is provided from the storage media 228. The raw data may comprise decoded or encoded data retrieved from the storage media 228. In any regard, once the machine learning coprocessor 230 executes the machine learning model to the raw data, the resulting output data of the machine learning algorithm may be referred to as transformed data and may include metadata and/or a portion of the raw data (e.g., such as extracted features or feature vectors with associated raw data representing the features). The transformed data may be provided to the host via the host bus interface 222 and/or written to the storage media 228 via the memory host controller interface 224. In this regard, the machine learning coprocessor 230 may comprise a low-power machine learning processor (e.g., capable of executing a deep learning algorithm on raw data populating the computational program memory 226).

Figure 3:
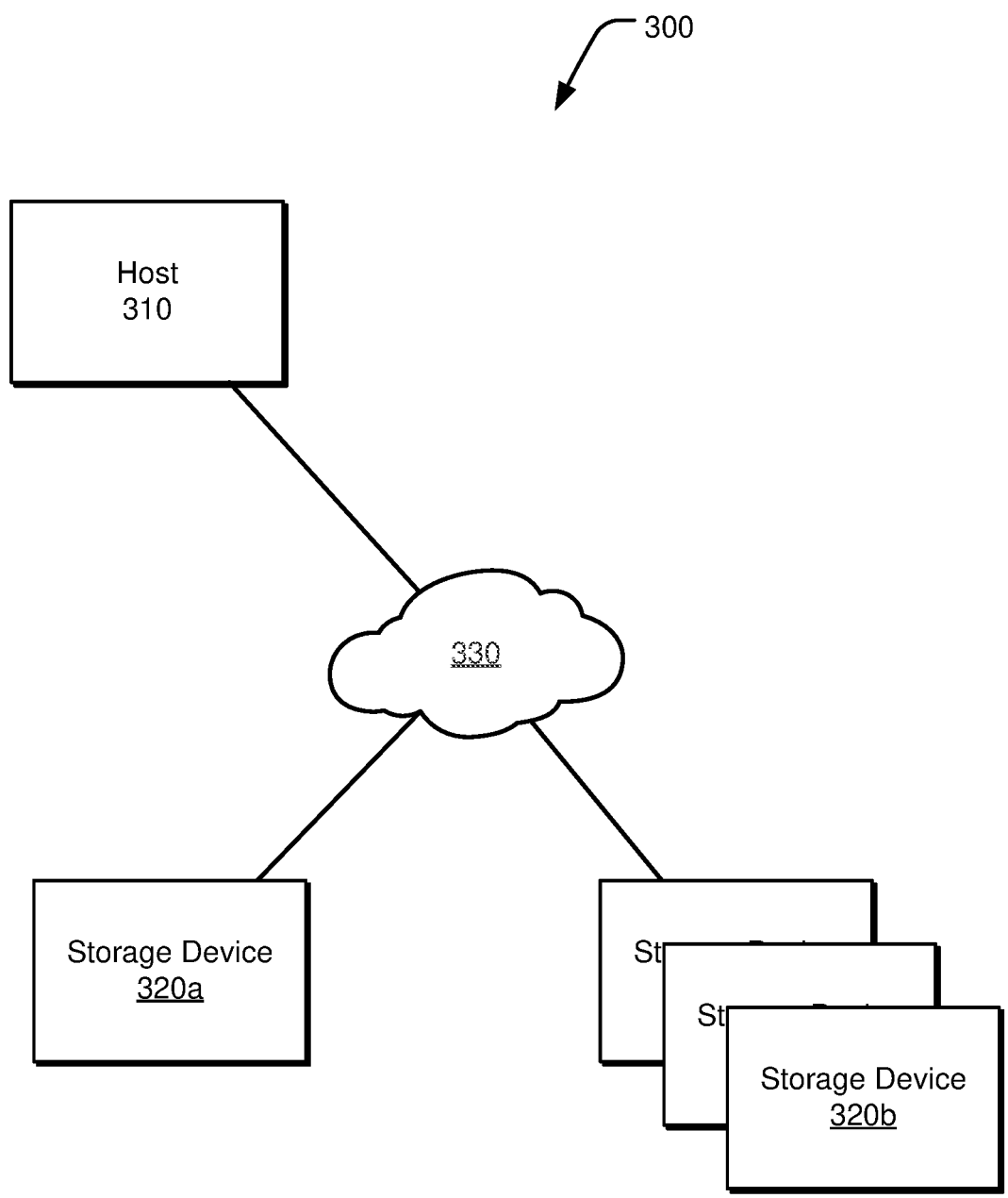
FIG. 3 depicts an example network having remote computational storage drives in communication with a host via the network.

By incorporating deep learning on the drive through a machine learning coprocessor (e.g., a deep learning processor), the CSD may enable highly parallel workloads across a plurality of CSDs. One such example of an environment for use of CSDs 320 to facilitate a highly parallel workloads is shown in FIG. 3. In FIG. 3, a plurality of CSDs 320 are in operative communication with a host 310 via a network 330. As can be appreciated, the CSDs 320 may comprise a single CSD 320*a* at a given network location or may include a plurality of locally situated CSDs 320*b*. In any regard and as will be further illustrated in the detailed description below, the host 310 may coordinate with the CSDs 320 such that the CSDs 320 may each execute a machine learning model using a local machine learning coprocessor on locally stored data from respective ones of the storage media at the CSDs. Example use models of CSD drives such as those illustrated in FIG. 3 may include facial recognition parallelized across drives (searching for a face across drives that includes facial data), preprocessing of data to be used in larger convolutional neural networks (such as processing an image with max-pooling and returning this image for use by an external convolutional neural network), natural language processing with local processing of text data stored at the drive, or other approaches without limit.

Figure 4:
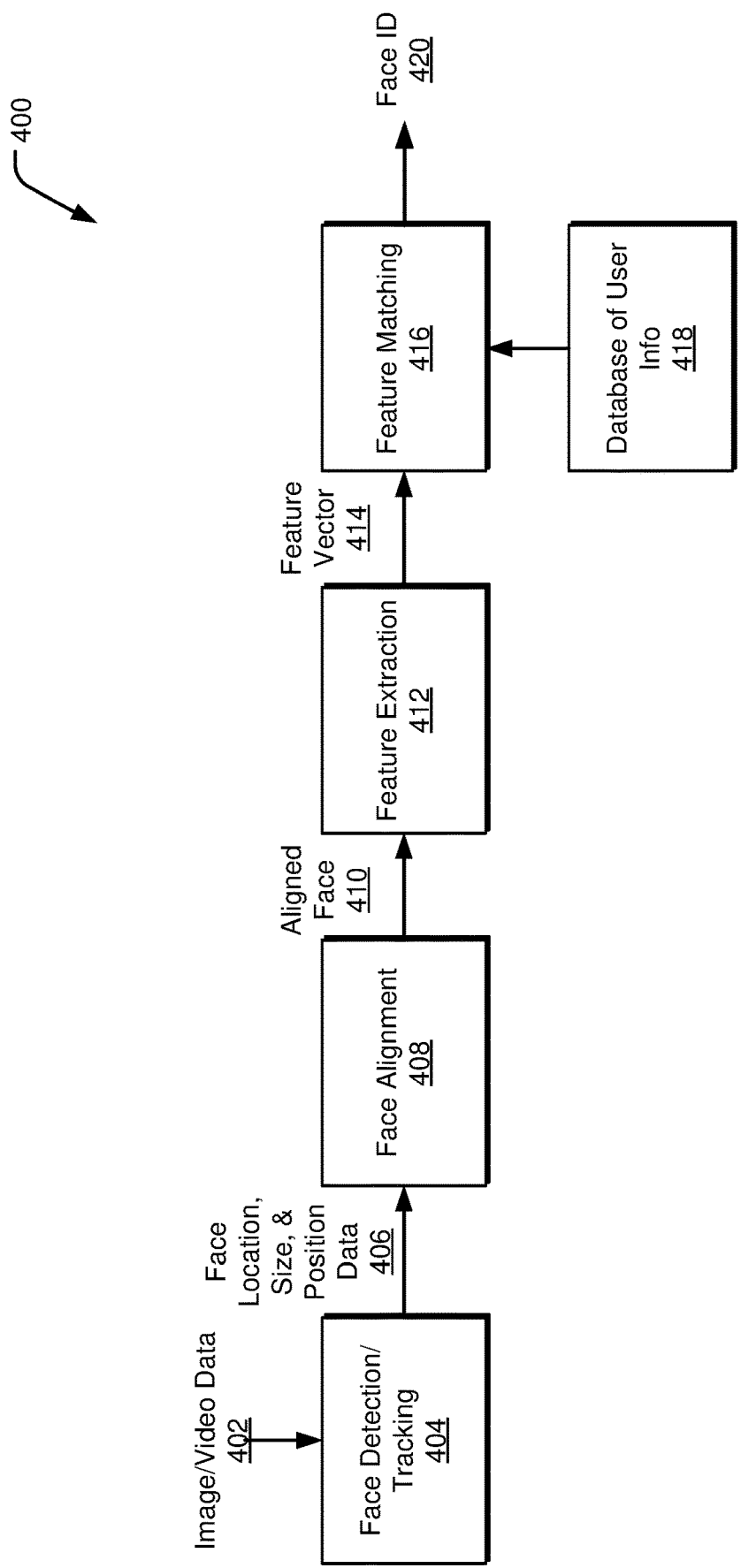
FIG. 4 depicts an example machine learning pipeline.

FIG. 4 illustrates a use-case that demonstrates use of CSDs in a machine learning application. The series of operations shown in FIG. 4 may collectively be referred to as a machine learning pipeline 400. The machine learning pipeline 400 may include a number of discrete machine learning operations. Collectively, the discrete machine learning operations may be applied to raw data to generate metadata and/or derivative data regarding the raw data for a given purpose. In the example depicted in FIG. 4, a facial recognition application may be facilitated to recognize individuals from video or image data. For example, raw data 402 in the form of image or video data may be provided as input to a machine learning processor. In turn, a face detection/tracking operation 404 may be applied to the raw data 402. Specifically, the face detection/tracking operation 404 may apply a machine learning model to the raw data 402 to identify facial features from the raw data 402 to provide metadata in the form of face location, size, and position data 406.

In turn, the face location, size, and position data 406 may be provided to a subsequent machine learning operation such as a face alignment operation 408. The face alignment operation 408 may receive the face location, size, and position data 406 as an input. The face alignment operation 408 may apply machine learning to this input data to output additional metadata comprising aligned face data 410. The aligned face data 410 may further be provided as input data to a feature extraction operation 412. The feature extraction operation 412 may apply further machine learning to the aligned face data 410 to output feature vectors 414.

A feature matching operation 416 may receive the feature vector data 414 from the feature extraction operation 412. The feature matching operation 416 may be in operative communication with a database of user information 418 that includes facial data of individuals in the database. In turn, the feature matching operation 416 may apply machine learning to match the feature vector data 414 produced from the application of the face detection/tracking operation 404, the face alignment operation 408, and the feature extraction operation 412 with the facial information from the database of user information 418 to face identification output data 420.

While facial recognition is provided as an example application of a plurality of discrete machine learning operations in FIG. 4, other applications may be applied without limitation. Examples may include natural language processing, bioinformatics, or any other potential application of machine learning. Importantly, the machine learning pipeline 400 includes multiple discrete operations performed on raw data and/or metadata derived from the raw information to perform the machine learning. The operations in FIG. 4 may be described in relation to the flow of data through the machine learning pipeline 400 such that the operations from left to right in FIG. 4 are described in ascending order. That is, operations to the right of FIG. 4 may be described as higher order operations relative to operations to the left. This may generally correspond to the flow of data from raw data 402 to the output data 420 in the form of facial identification. That is, higher order operations may receive input data and/or metadata from lower order operations in the machine learning pipeline 400. As such, it may be appreciated that some lower-level operations in the machine learning pipeline 400 may be advantageously performed at a CSD to locally stored data on the CSD to return input data in the form of transformed data to higher order machine learning operations (which may be executed remotely from the CSD)

For example, in a traditional machine learning environment, each of the discrete machine learning operations (e.g., the face detection/tracking operation 404, the face alignment operation 408, the feature extraction operation 412, and the feature matching operation 416) may be executed using machine learning processor that executes a machine learning model to apply machine learning to the respective input data to an operation. In this regard, the machine learning processor may comprise a working memory that stores data during the application of the machine learning to the data. Given the potentially large size of the data to which machine learning is to be applied, the working memory cannot feasibly store the entire corpus of data to which the machine learning model is to be applied. As such, the processor may act as a host to issue read and write commands to a memory system for retrieval and storage of raw data and/or generated metadata in association with each of the discrete machine learning operations, which may be stored in drives remote from the machine learning processor. Of particular note, such data may be stored in edge devices that are distant from the machine learning processor in a network topology.

Figure 5:
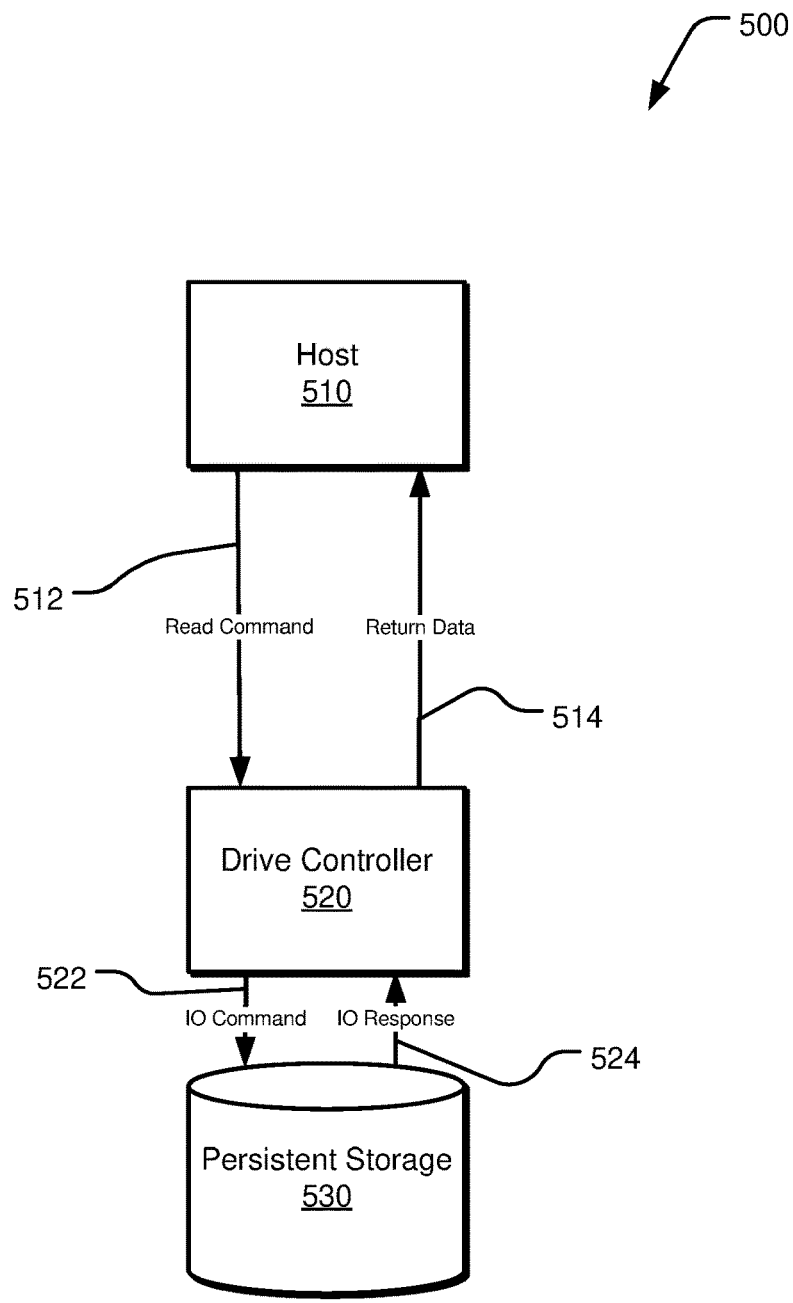
FIG. 5 depicts an example operation for retrieval of data in response to a command issued from a host.

Such an approach requiring issuance of read commands for retrieval of input data for each discrete machine learning operation is described with additional reference to FIG. 5. As an example, prior to each operation, the machine learning processor may act as a host 510 to issue a read command 512 to a drive controller 520 storing the respective input data for a given operation. The drive controller 520 provides an I/O command to persistent storage 530 of the drive. In turn, an I/O response 524 is provided to drive controller 520 comprising the data requested by the host 510. The drive controller 520 returns the requested data from the persistent storage 530 to the host 510 as return data 514.

As may be appreciated, with returned reference to the machine learning pipeline 400 in FIG. 4, these steps illustrated in FIG. 5 may be required to be performed for retrieval of input data for each machine learning operation in the machine learning pipeline 400. Also, while not illustrated, at the conclusion of each machine learning operation in the machine learning pipeline 400, a corresponding write operation may be issued from the host 510 for storage of the resulting output data generated by the machine learning operation for storage in the persistent storage 530 at the conclusion of each machine learning operation.

As may be appreciated, the approach illustrated in in FIG. 5 for execution of a machine learning pipeline 400 may provide significant drawbacks. For instance, the persistent storage 530 provided by a storage drive may not be local to the host 510 comprising the machine learning processor executing the machine learning pipeline 400. In turn, the read commands 512 and return data 514 may have to traverse a network connection with each instance of the read command 512 and return data 514. This may occupy significant network resources to exchange the data to be read from and written to persistent storage 530.

Furthermore, in the context of distributed data such as in the context illustrated in FIG. 1 in which data may be located at or near edge devices, retrieval of data may require the host 510 to issue read commands 512 to each of the respective devices from which data is to be retrieved. In turn, the issuance of read commands 512 and return data 514 according to the approach illustrated in FIG. 5 may require large amounts of data to transverse a network, which leads to significant bandwidth utilization, particularly for very large portions of data. Furthermore, as all machine learning operations in the machine learning pipeline 400 are executed by the machine learning processor, the resources required for the machine learning processor are great, especially if the application requires rapid application of machine learning operations.

Figure 6:
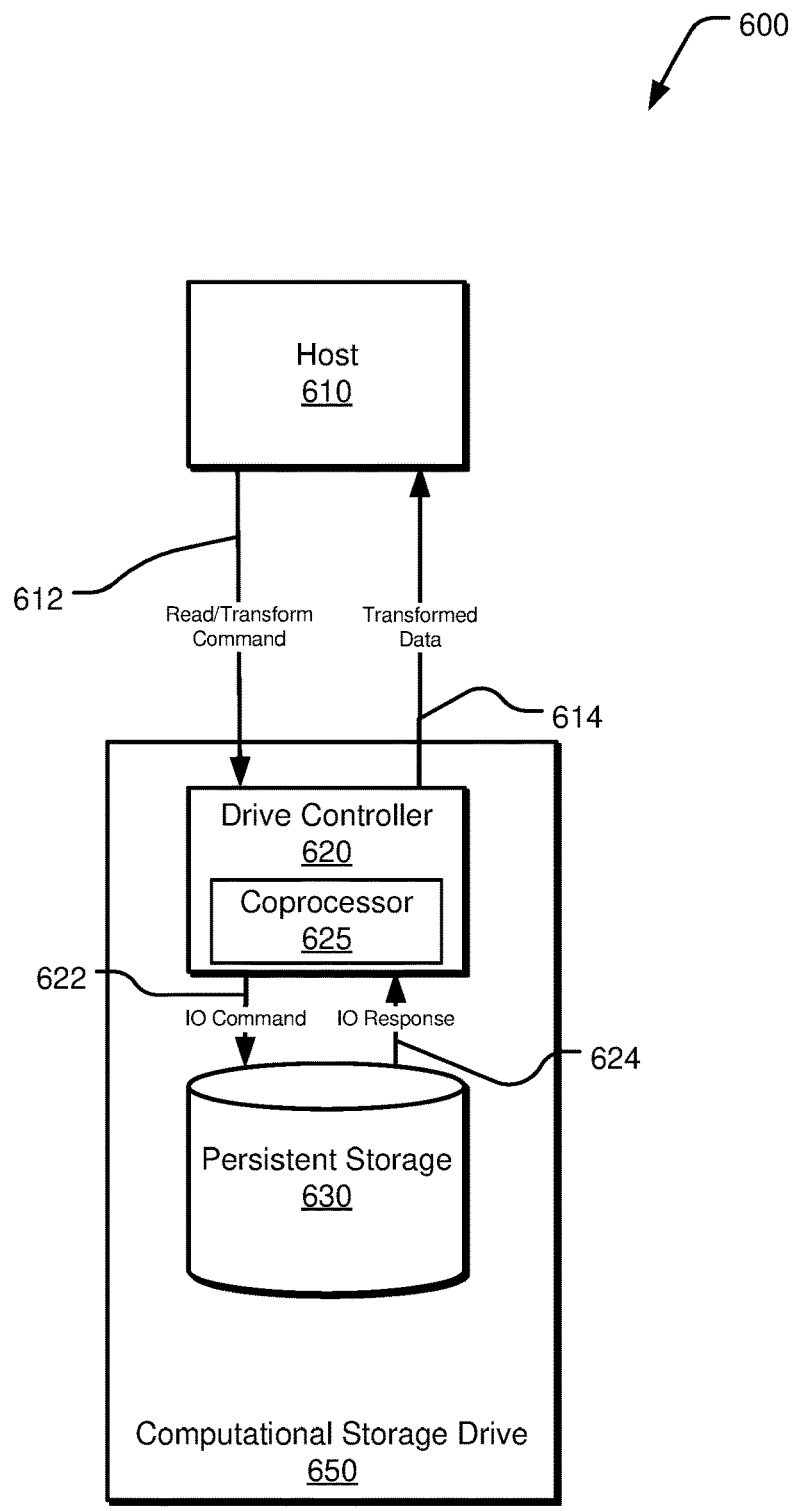
FIG. 6 depicts an example operation for transformation of data at a computational storage drive to return transformed data to a host.
Figure 7:
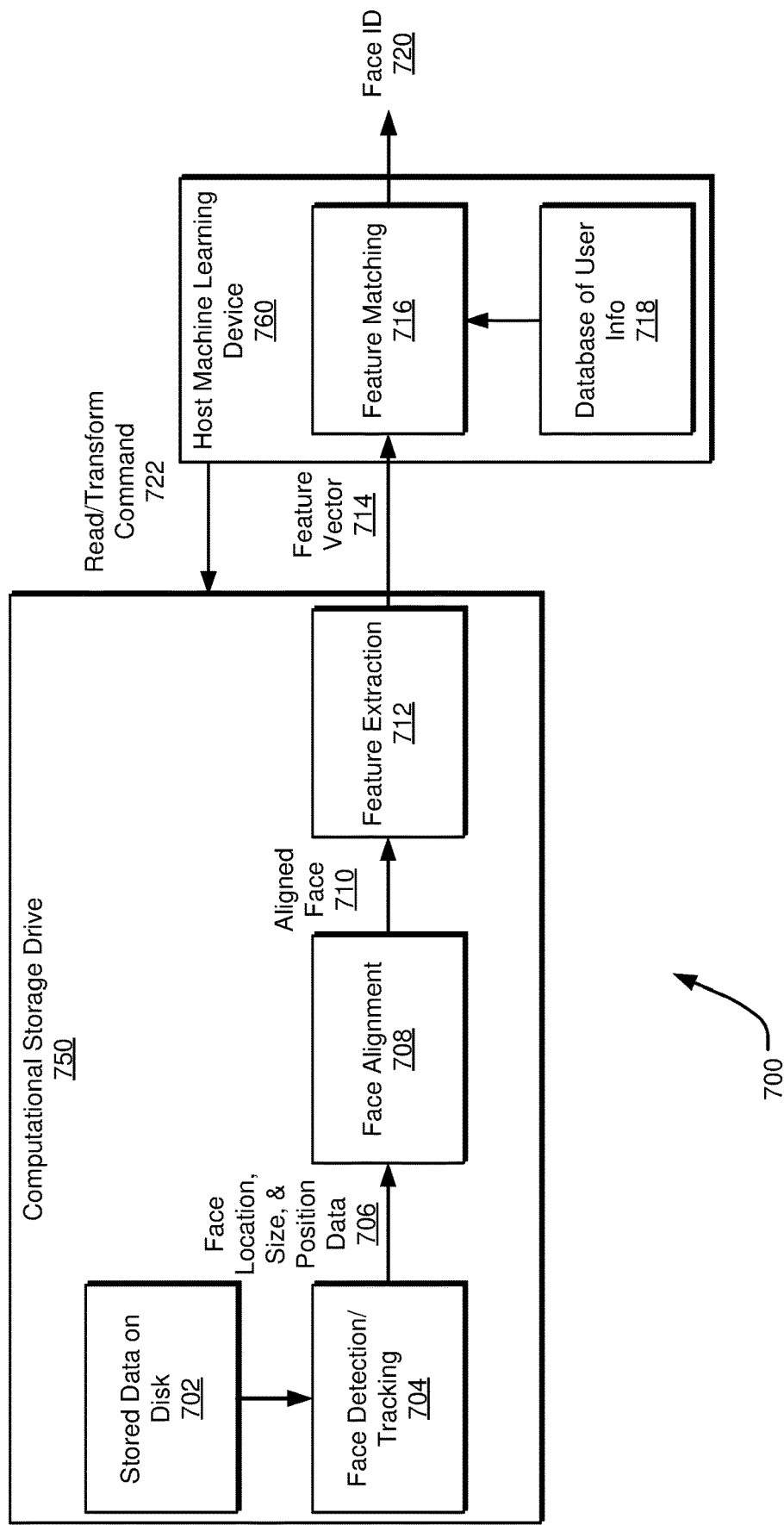
FIG. 7 depicts an example of a machine learning pipeline at least partially executed at one or more computational storage drives.

In turn, with reference to FIGS. 6 and 7, examples will be illustrated in which one or more CSDs may perform one or more machine learning operations in the context of a machine learning pipeline comprising a plurality of discrete machine learning operations. For instance, the CSD referenced in FIGS. 6 and 7 may be provided according to the example illustrated in FIG. 2 in which the CSD 220 includes a machine learning coprocessor 230 provided locally relative to storage media 228 at which raw data is stored.

In FIG. 6, rather than simply issuing a read command to request raw data from a storage drive for retrieval of the raw input data to the host, the host 610 may issue a read/transform command 612. The read/transform command 612 may identify data in the persistent storage 630 of a CSD 650. The read/transform command 612 may also identify one or more machine learning operations to be applied to the identified data locally at the CSD 650. In turn, rather than merely requesting the data be read and returned to the host 610 as was the case in FIG. 5, the host 610 provides a request for data after having undergone one or more machine learning operations locally at the CSD 650.

In turn, upon receipt of the read/transform command 612, the drive controller 620 may issue an I/O command 622 to retrieve raw data from the persistent storage 630 at the drive. The raw data may be returned to the drive controller 620 as an I/O response 624 and be used to populate a computational program memory of the CSD 650. In turn, a machine learning coprocessor 625 may execute one or more machine learning operations identified by the read/transform command 612 locally at the drive to generate transformed data 614 locally at the CSD 650. In turn, the transformed data 614 (e.g., including a portion of the raw data extracted from the bulk of the raw data, metadata regarding the raw data, or both) may be returned to the host 610 in response to the read/transform command 612.

As such, rather than issuing read and write commands associated with each individual machine learning operation in a machine learning pipeline, the configuration depicted in FIG. 6 may allow a host 610 to issue a read/transform command 612 such that one or more machine learning operations of the machine learning pipeline may be executed locally at the CSD 650 such that transform data 614 may be returned to the host 610. This may be considered "preprocessing" of the raw data at the CSD 650 such that some level of machine learning (e.g., to prepare, condition, or filter data) may be applied at the CSD 650.

This concept is further illustrated in FIG. 7 that generally corresponds to the machine learning pipeline 400 illustrated in FIG. 4. However, rather than a given machine learning processor executing all operations of the machine learning pipeline 400, the machine learning pipeline 700 illustrated in FIG. 7 includes use of a CSD 750 to execute a plurality of the machine learning operations of the pipeline 700 prior to returning any data to a host machine learning device 760 for further application of higher order machine learning operations. For example, the CSD 750 may be operable to perform a phase detection/tracking operation 704, a face alignment operation 708, and a feature extraction operation 712 locally at the CSD 750 on raw data 702 stored locally at the CSD 750. Such operations may be in response to a read/transform command 722 received from the host machine learning device 760. That is, the CSD 750 may be operative to retrieved raw data 702 stored in the storage media of the CSD 750 and provide the raw data 702 as an input to the phase detection/tracking operation 704 executed by a machine learning coprocessor resident in the CSD 750.

In turn, metadata comprising face location, size, and position data 706 may be either stored on the storage media of the CSD 750 or in computational program memory of the CSD 750. In any regard, the face location, size, and position data 706 may be provided to the machine learning coprocessor resident in the CSD 750 for application of the face alignment operation 708 to this data. Additionally, metadata in the form of aligned face data 710 may also be provide to a feature extraction operation 712 to generate feature vector data 714. As may be appreciated, the feature vector data 714 may comprise a significantly smaller amount of data than the raw data 702. In turn, when the feature vector data 714 is returned to the host machine learning device 760, the bandwidth and/or computational load of the feature vector data 714 may be significantly reduced as compared to retrieving and returning input and output data for each machine learning operation from the host machine learning device 760.

In turn, a higher order feature matching operation 716 may be applied by the machine learning device 760 in response to receipt of the feature vector data 714 from the CSD 750. This may include matching the feature vector data 714 to the database of user information 718 to produce a face identification 720 much like that shown in FIG. 4, with the exception that the host machine learning device 760 may only execute the feature matching operation 716 on feature vector data 714 received from the CSD 750. Thus, the machine learning processor at the host machine learning device 760 may have more computational resources directed to the feature matching operation 716 (e.g., to process more data or data more quickly). Alternatively, the machine learning processor may have fewer computational resources dedicated as less computational capacity may be required to perform the feature matching operation 716 as compared to all operations of the pipeline 700.

Furthermore, by executing one or more machine learning operations of a machine learning pipeline locally at a CSD, advantages of highly parallelized processing may also be realized. This may be particularly relevant in a distributed storage environment in which the raw data for a machine learning pipeline may be distributed over many remotely located storage devices.

Figure 8:
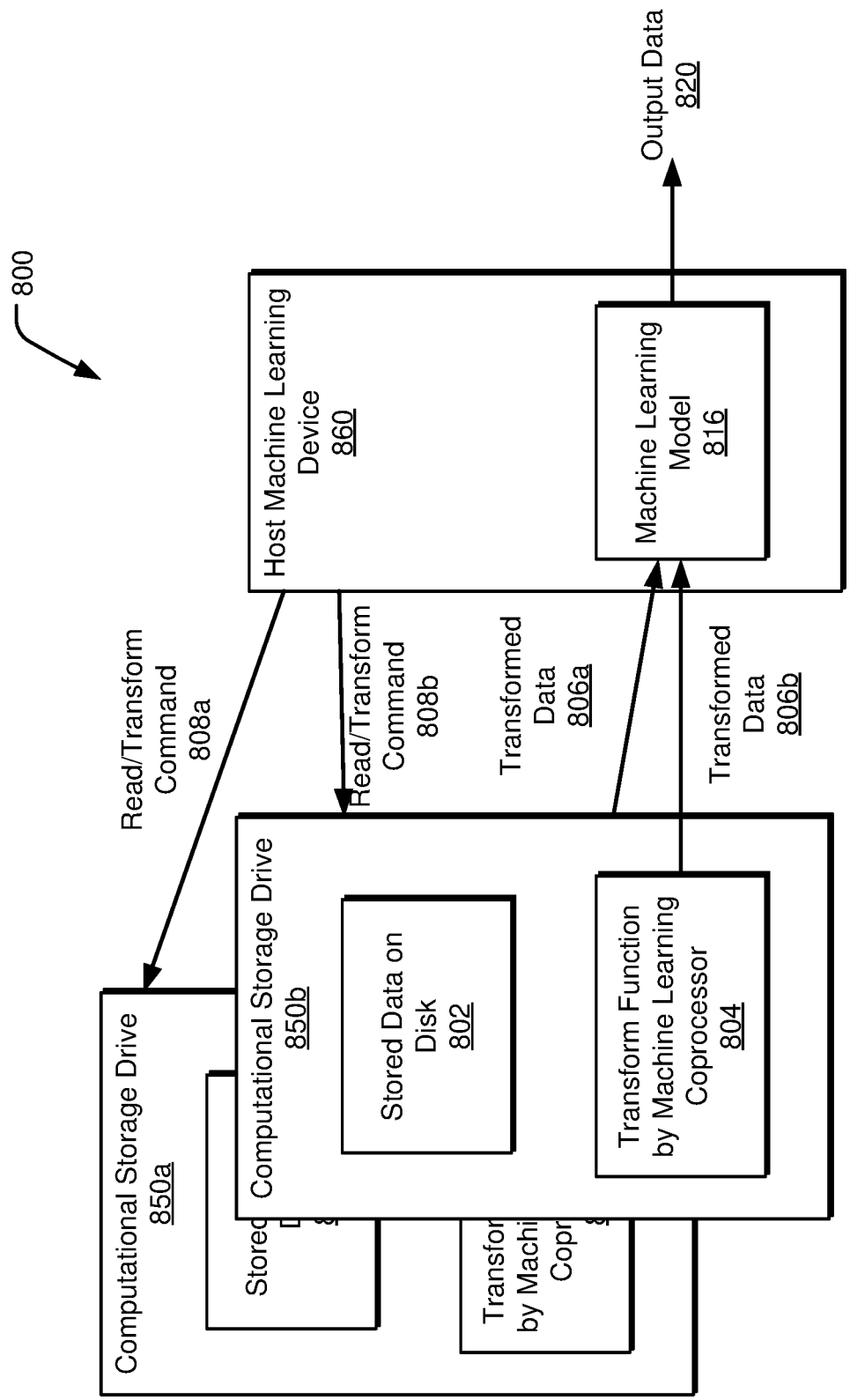
FIG. 8 depicts an example environment in which a plurality of computational storage drives execute in parallel.

With further reference to FIG. 8, one such environment 800 is illustrated that leverages use of CSDs to locally execute one or more machine learning operations in a machine learning pipeline to provide highly parallelized computational efficiency. A host machine learning device 860 may issue read/transform commands 808a and 808b in parallel to a plurality of CSDs 850a and 850b. While two CSDs are depicted in FIG. 8, it may be appreciated the number of CSDs that receive parallel read/transform commands may be larger than two to provide increased efficiencies.

Each of the individual CSDs 850a and 850b may, in response to receipt of the read/transform command 808a or 808b, respectively, locally access raw data 802 stored at the respective CSD 850 and apply one or more machine learning operations using a local machine learning coprocessor 804 in the CSD 850. In turn, each CSD 850a and 850b may generate respective transformed data 806a and 806b in response to the parallel read/transform commands 808a and 808b issued to each respective CSD 850. In this example, each CSD 850a and 850b may perform one or more machine learning operations locally with respect to locally stored raw data. As such, the machine learning processor of the host machine learning device 860 may receive the transformed data 806a and 806b from the respective CSDs 850. As may be appreciated, this allows certain machine learning operations that would otherwise be performed at the host machine learning device 860 to be offloaded to respective CSDs 850. The local application of machine learning operations at the CSDs 860 may be executed with relatively low power machine learning coprocessors at each respective CSD 850 to provide parallelized processing of the local data. In turn, the host machine learning device 860 may aggregate transformed data 806a and 806b from the plurality of CSDs 850 for application of higher order machine learning operations to the aggregated transformed data 806. This may reduce the amount of network bandwidth being dedicated to intermediate machine learning operation data exchange and also allows for execution of one or more machine learning operations locally at an edge device where the raw data is stored. Thus, significant portions of the machine learning pipeline may be applied locally at each CSD 850 to provide highly parallelized computation of at least portions of machine learning pipeline ahead of providing higher level machine learning operations by the host machine learning device 860 to generate output data 820.

Figure 9:
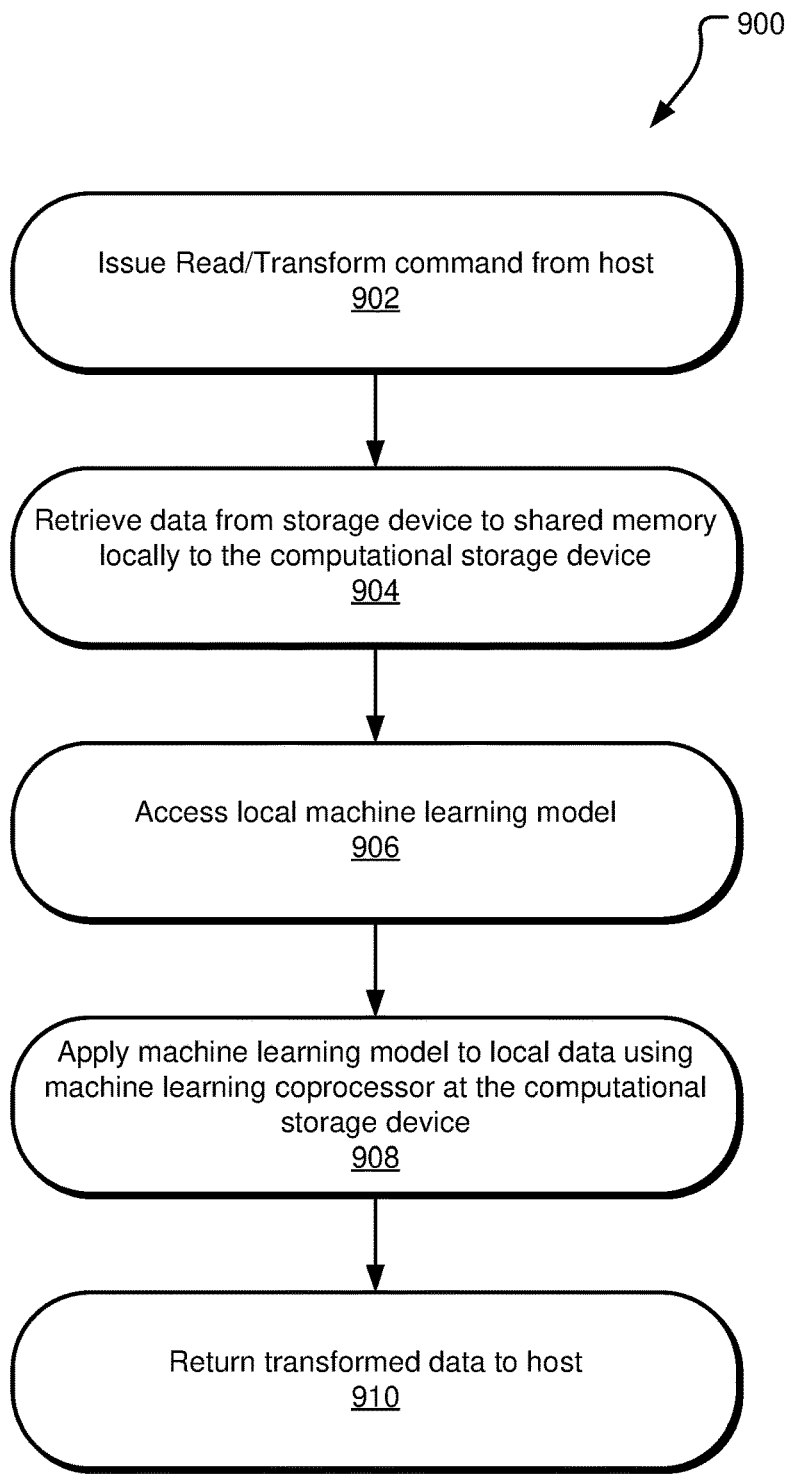
FIG. 9 depicts example operations for a computational storage drive.

With further reference to FIG. 9, example operations 900 are depicted for an example of a process for operation of a CSD in a machine learning pipeline. The operations 900 may include in issuing operation 902 in which a host device issues a read/transform command to one or more CSDs. In turn, a retrieving operation 904 may be performed at the CSD to retrieve data stored locally in non-volatile memory at the computational storage device. The retrieving operation 904 may include retrieving data from the non-volatile memory to populate a shared memory locally at the CSD. In turn, an accessing operation 906 may include accessing a local machine learning model at the CSD by a machine learning coprocessor executing at the CSD. In turn, an applying operation 908 may be performed in which the machine learning coprocessor at the CSD applies the machine learning model to the raw data at the CSD (e.g., in the shared memory at the CSD). The applying operation 908 may result in the generation of transformed data resulting from the application of the machine learning model to the raw data at the CSD. In turn, the operations 900 may include a returning operation 910 in which the transformed data generated by the CSD is returned to the host from which the read/transform command was issued. As may be appreciated, the operations 900 may be performed in parallel by a plurality of CSDs parallelized across a plurality CSDs.

Figure 10:
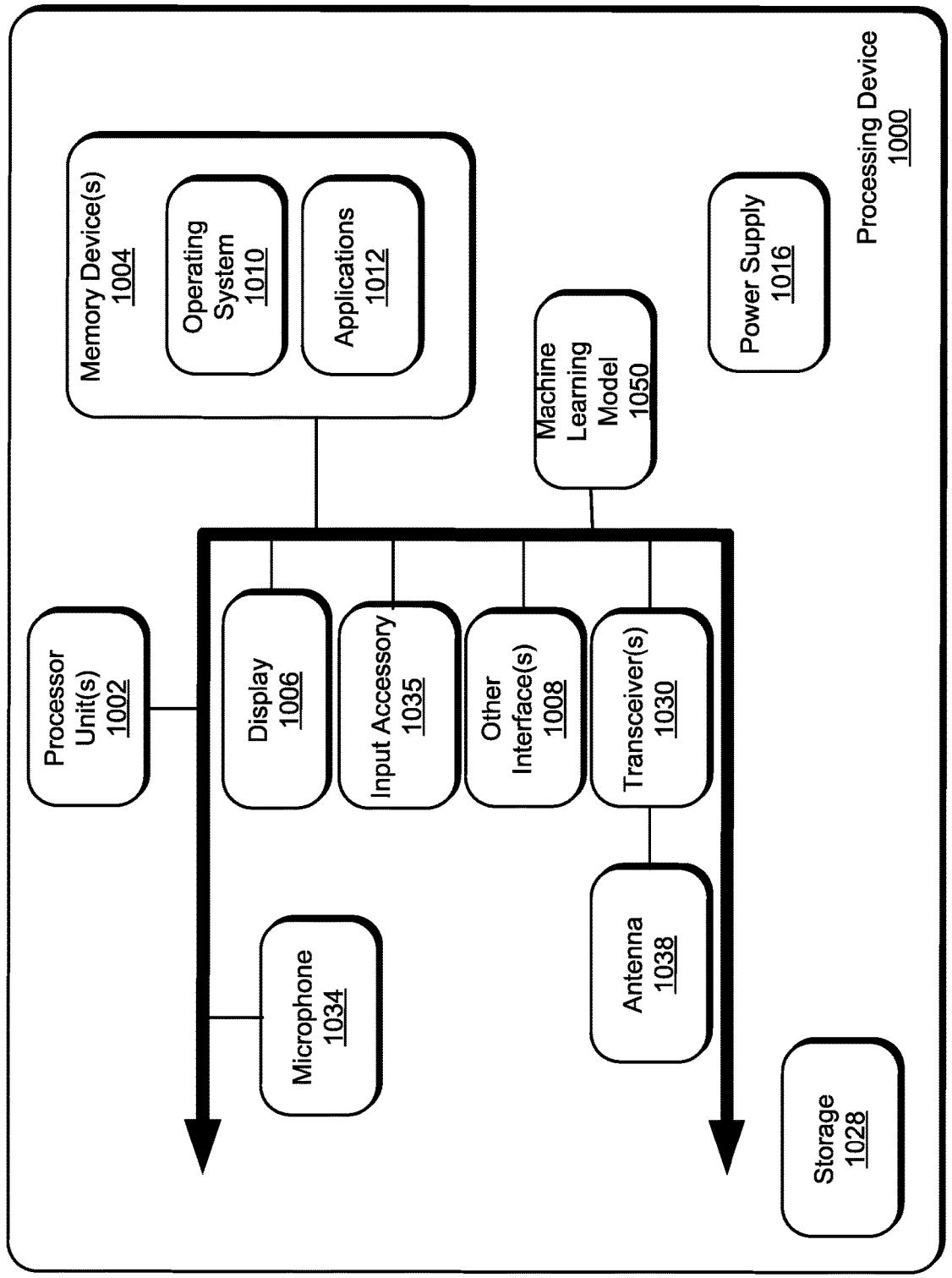
FIG. 10 depicts an example computing device for executing aspects of the present disclosure.

FIG. 10 illustrates an example schematic of a computing device 1000 suitable for implementing aspects of the disclosed technology including a machine learning model 1050 as described above. The computing device 1000 includes one or more processor unit(s) 1002, memory 1004, a display 1006, and other interfaces 1008 (e.g., buttons). The memory 1004 generally includes both volatile memory (e.g., RAM) and non-volatile memory (e.g., flash memory). An operating system 1010, such as the Microsoft Windows® operating system, the Apple macOS operating system, or the Linux operating system, resides in the memory 1004 and is executed by the processor unit(s) 1002, although it should be understood that other operating systems may be employed.

One or more applications 1012 are loaded in the memory 1004 and executed on the operating system 1010 by the processor unit(s) 1002. Applications 1012 may receive input from various input local devices such as a microphone 1034, input accessory 1035 (e.g., keypad, mouse, stylus, touchpad, joystick, instrument mounted input, or the like). Additionally, the applications 1012 may receive input from one or more remote devices such as remotely-located smart devices by communicating with such devices over a wired or wireless network using more communication transceivers 1030 and an antenna 1038 to provide network connectivity (e.g., a mobile phone network, Wi-Fi®, Bluetooth®). The computing device 1000 may also include various other components, such as a positioning system (e.g., a global positioning satellite transceiver), one or more accelerometers, one or more cameras, an audio interface (e.g., the microphone 1034, an audio amplifier and speaker and/or audio jack), and storage devices 1028. Other configurations may also be employed.

The computing device 1000 further includes a power supply 1016, which is powered by one or more batteries or other power sources and which provides power to other components of the computing device 1000. The power supply 1016 may also be connected to an external power source (not shown) that overrides or recharges the built-in batteries or other power sources.

In an example implementation, the computing device 1000 comprises hardware and/or software embodied by instructions stored in the memory 1004 and/or the storage devices 1028 and processed by the processor unit(s) 1002. The memory 1004 may be the memory of a host device or of an accessory that couples to the host. Additionally or alternatively, the computing device 1000 may comprise one or more field programmable gate arrays (FPGAs), application specific integrated circuits (ASIC), or other hardware/software/firmware capable of providing the functionality described herein.

The computing device 1000 may include a variety of tangible processor-readable storage media and intangible processor-readable communication signals. Tangible processor-readable storage can be embodied by any available media that can be accessed by the computing device 1000 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 1000. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

One general aspect of the present disclosure includes a computational storage drive in a machine learning pipeline. The drive includes persistent storage media configured for non-volatile storage of raw data at the computational storage drive. The drive also includes computational program memory in operative communication with the persistent storage media via a high-speed local non-volatile memory bus. The drive also includes a machine learning coprocessor in the computational storage drive and in operative communication with the persistent storage media and the computational program memory for population of the computational program memory with the raw data from the persistent storage media in response to a read transform command received from a host device. The machine learning coprocessor is operative to apply a machine learning model to the raw data populating the computational program memory to generate transformed data corresponding to the read transform command. The drive also includes a host bus providing operative communication to the host device for returning the transformed data in response to the read transform command.

Implementations may include one or more of the following features. For example, the machine learning coprocessor may be operative to store the transformed data in the persistent storage media after generation of the transform data.

In an example, the machine learning model may be stored locally at the computational storage drive, and the read transform command comprises a machine learning operation corresponding to the machine learning model. The machine learning operation may include one of a plurality of machine learning operations in a machine learning pipeline. The transformed data may be further processed by the host device with other machine learning operations of the machine learning pipeline to generate machine learning data based on the transformed data. The transformed data may be a smaller size on disk than the raw data.

In an example, the machine learning coprocessor may be operative to decode the raw data locally at the computational program memory in response to the read transform command for application of the machine learning model on the raw data to generate the transform data.

Another general aspect of the present disclosure includes a machine learning system. The system includes a plurality of computational storage drives according to any of the foregoing aspect or examples. The system also includes a host device in operative communication with the plurality of computational storage drives to receive the transformed data from each respective one of the plurality of computational storage drives in response to the read transform command. The host device is operative to aggregate the transform data from the plurality of computational storage drives for application of higher-level machine learning model to the transform data.

Another general aspect of the present disclosure includes a method for operation of a computational storage drive in a machine learning pipeline. The method includes receiving a read transform command from a host device and accessing raw data in persistent storage media of the computational storage drive. The method also includes populating a computational program memory of the computational storage drive with the raw data. The method includes applying a machine learning model using a machine learning coprocessor at the computational storage drive to generate transformed data corresponding to the read transform command. In turn, the method includes returning the transformed data to the host device.

Implementations may include one or more of the following features. For example, the method may also include storing the transformed data in the persistent storage media after generation of the transform data.

In an example, the machine learning model may be stored locally at the computational storage drive, and the read transform command may be a machine learning operation corresponding to the machine learning model.

In an example, the machine learning operation may include one of a plurality of machine learning operations in a machine learning pipeline. In turn, the method may include processing the transformed data by the host device with other machine learning operations of the machine learning pipeline to generate machine learning data based on the transformed data. In this regard, the transformed data may have a smaller size on disk than the raw data.

In an example, the method may include decoding the raw data using the machine learning coprocessor locally at the computational program memory in response to the read transform command for application of the machine learning model on the raw data to generate the transform data.

Another general aspect of the present disclosure includes a method of operation of a machine learning system. The method includes performing the method of any one of the foregoing aspect or examples at each of a plurality of computational storage drives. The method also includes receiving the transformed data from each respective one of the plurality of computational storage drives at a host device in response to the read transform command. The method further includes aggregating the transform data from the plurality of computational storage drives and applying a higher-level machine learning model to aggregated transform data.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A computational storage drive in a machine learning pipeline, comprising:
   persistent storage media configured for non-volatile storage of raw data at the computational storage drive;
   computational program memory in the computational storage drive that is in operative communication with the persistent storage media via a high-speed local non-volatile memory bus;
   a machine learning coprocessor in the computational storage drive that is in operative communication with the persistent storage media and the computational program memory for population of the computational program memory with the raw data from the persistent storage media of the computational storage drive in response to a read transform command received from a host device, wherein the machine learning coprocessor is operative to apply a machine learning model that is stored locally at the computational storage drive to the raw data of the persistent storage media populating the computational program memory to generate transformed data corresponding to the read transform command; and
   a host bus providing operative communication to the host device for returning the transformed data in response to the read transform command.

2. The computational storage drive of claim 1, wherein the machine learning coprocessor is operative to store the transformed data in the persistent storage media after generation of the transform data.

3. The computational storage drive of claim 1, wherein the read transform command comprises a machine learning operation corresponding to the machine learning model.

4. The computational storage drive of claim 3, wherein the machine learning operation comprises one of a plurality of machine learning operations in a machine learning pipeline, and wherein the transformed data is further processed by the host device with other machine learning operations of the machine learning pipeline to generate machine learning data based on the transformed data.

5. The computational storage drive of claim 4, wherein the transformed data comprises a smaller size on disk than the raw data.

6. The computational storage drive of claim 3, wherein the machine learning coprocessor is operative to decode the raw data locally at the computational program memory in response to the read transform command for application of the machine learning model on the raw data to generate the transform data.

7. A machine learning system, comprising:
   a plurality of computational storage drives according to claim 1;
   a host device in operative communication with the plurality of computational storage drives to receive the transformed data from each respective one of the plurality of computational storage drives in response to the read transform command; and
   wherein the host device is operative to aggregate the transform data from the plurality of computational storage drives for application of higher-level machine learning model to the transform data.

8. A method for operation of a computational storage drive in a machine learning pipeline, comprising:
   receiving a read transform command from a host device;
   accessing raw data in persistent storage media of the computational storage drive;
   populating a computational program memory in the computational storage drive with the raw data from the persistent storage media of the computational storage drive;
   applying a machine learning model that is stored locally at the computational storage drive using a machine learning coprocessor in the computational storage drive to generate transformed data corresponding to the read transform command; and
   returning the transformed data to the host device.

9. The method of claim 8, further comprising:
   storing the transformed data in the persistent storage media after generation of the transform data.

10. The method of claim 8, wherein the read transform command comprises a machine learning operation corresponding to the machine learning model.

11. The method of claim 10, wherein the machine learning operation comprises one of a plurality of machine learning operations in a machine learning pipeline, and the method further comprises:
  processing the transformed data by the host device with other machine learning operations of the machine learning pipeline to generate machine learning data based on the transformed data.

12. The method of claim 11, wherein the transformed data comprises a smaller size on disk than the raw data.

13. The method of claim 10, further comprising:
  decoding the raw data using the machine learning coprocessor locally at the computational program memory in response to the read transform command for application of the machine learning model on the raw data to generate the transform data.

14. A method of operation of a machine learning system, comprising:
  performing the method of claim 8 at each of a plurality of computational storage drives;
  receiving the transformed data from each respective one of the plurality of computational storage drives at a host device in response to the read transform command;
  aggregating the transform data from the plurality of computational storage drives; and
  applying a higher-level machine learning model to aggregated transform data.

* * * * *